United States Patent
Song et al.

(10) Patent No.: US 10,341,829 B2
(45) Date of Patent: Jul. 2, 2019

(54) DIRECTED DATA PLAN SERVICE-LAUNCHING SYSTEM AND METHOD FOR VIRTUAL OPERATOR

(71) Applicant: SUZHOU SNAIL DIGITAL TECHNOLOGY CO., LTD., Jiangsu (CN)

(72) Inventors: Jimeng Song, Jiangsu (CN); Guanghui Tian, Jiangsu (CN); Chao Guo, Jiangsu (CN); Peng Jia, Jiangsu (CN)

(73) Assignee: SUZHOU SNAIL DIGITAL TECHNOLOGY CO., LTD. (CN)

( * ) Notice: Subject to any disclaimer, the term of this patent is extended or adjusted under 35 U.S.C. 154(b) by 0 days.

(21) Appl. No.: 15/745,310

(22) PCT Filed: Jul. 6, 2016

(86) PCT No.: PCT/CN2016/088786
§ 371 (c)(1),
(2) Date: Jan. 16, 2018

(87) PCT Pub. No.: WO2017/020677
PCT Pub. Date: Feb. 9, 2017

(65) Prior Publication Data
US 2019/0014453 A1   Jan. 10, 2019

(30) Foreign Application Priority Data
Jul. 31, 2015   (CN) .......................... 2015 1 0460992

(51) Int. Cl.
*H04M 11/00* (2006.01)
*H04W 4/24* (2018.01)
(Continued)

(52) U.S. Cl.
CPC ............... *H04W 4/24* (2013.01); *H04L 12/14* (2013.01); *H04L 12/1403* (2013.01);
(Continued)

(58) Field of Classification Search
CPC ......... H04W 4/24; H04W 8/18; H04M 15/80; H04M 15/66; H04M 15/58; H04M 2215/32
(Continued)

(56) References Cited

U.S. PATENT DOCUMENTS

2002/0174335 A1* 11/2002 Zhang ................. H04L 63/0227
713/168
2002/0176378 A1* 11/2002 Hamilton .............. H04W 76/20
370/328
(Continued)

FOREIGN PATENT DOCUMENTS

| CN | 102026141 | 4/2011 | ............. H04W 4/24 |
| CN | 102098650 | 6/2011 | ............. H04W 4/24 |

(Continued)

OTHER PUBLICATIONS

International Search Report (w/translation), dated Sep. 28, 2016 (12 pgs).

*Primary Examiner* — Rafael Pérez-Gutiérrez
*Assistant Examiner* — Mark G. Pannell
(74) *Attorney, Agent, or Firm* — Hayes Soloway P.C.

(57) ABSTRACT

A directed data plan service-launching system includes an intelligent communication terminal, a virtual operator directed data plan system, a virtual operator billing system and an application background server, wherein the intelligent communication terminal calculates and stores mobile network data usage, and periodically uploads the same to the virtual operator directed data plan system with a certain time period, the virtual operator directed data plan system performs bill integration on data of the data usage to form and send a directed data plan bill to the virtual operator billing system, and the virtual operator billing system performs a charge deduction or billing with a specific price on the directed data plan bill; a primary operator billing system
(Continued)

performing a charge deduction or billing with a specific price on the directed data plan bill; and an application background service system providing a background service to an application client side.

6 Claims, 2 Drawing Sheets

(51) Int. Cl.
*H04M 15/00* (2006.01)
*H04W 8/18* (2009.01)
*H04L 12/14* (2006.01)

(52) U.S. Cl.
CPC .......... *H04M 15/00* (2013.01); *H04M 15/44* (2013.01); *H04M 15/51* (2013.01); *H04M 15/58* (2013.01); *H04M 15/61* (2013.01); *H04M 15/66* (2013.01); *H04M 15/80* (2013.01); *H04W 8/18* (2013.01); *H04M 2215/32* (2013.01)

(58) Field of Classification Search
USPC ........................................... 455/406
See application file for complete search history.

(56) References Cited

U.S. PATENT DOCUMENTS

| | | | | |
|---|---|---|---|---|
| 2010/0330957 | A1* | 12/2010 | Harada | H04M 15/00 455/406 |
| 2014/0128020 | A1* | 5/2014 | Ramprasad | H04W 12/12 455/405 |
| 2014/0173111 | A1* | 6/2014 | Varner | H04L 63/0281 709/225 |
| 2015/0341505 | A1* | 11/2015 | Rivera | H04M 15/58 455/406 |

FOREIGN PATENT DOCUMENTS

| | | | |
|---|---|---|---|
| CN | 103716767 | 4/2014 | ............ H04W 4/24 |
| CN | 104703161 | 6/2015 | ............ H04W 4/24 |
| CN | 105429842 | 3/2016 | ............ H04L 12/46 |
| EP | 1324250 | 7/2003 | ............ G06F 17/60 |

* cited by examiner

DIRECTED DATA PLAN SERVICE-LAUNCHING SYSTEM AND METHOD FOR VIRTUAL OPERATOR

I. TECHNICAL FIELD

The present invention relates to the field of mobile communication technology, in particular to directed data plan service-launching system and method for virtual operator.

II. BACKGROUND ART

As the telecommunication service technology is innovated and developed, the requirements for telecommunication services are increased continuously, and the categories of telecommunication services are increased rapidly. Traditional telecommunication operators have focused their business in core network construction and maintenance for which they do best, in order to preserve their core market competitiveness while keeping efficient operation at a low cost, they have outsourced a large number of value added services and functional services to more specialized companies, and they cooperate with those specialized companies for the services. As the subscribers' requirements for service quality and services become higher and higher, virtual operators have emerged as the times require.

The emergence of virtual operators has changed the telecommunication operation pattern in the past. Viewed from business operation, virtual operators provide services to their customers by leasing and using networks, cast more efforts in fields such as new service development, operation, promotion, and sale, so as to provide more professional services to subscribers.

Besides, as telecommunication services and mobile Internet services are developed, Internet application vendors and infrastructure operators have cooperated with each other, and directed data plan services have emerged. However, virtual operators do not possess network resources, and cannot configure data (e.g., application IPs) at core network elements directly and discount for specific IP traffic and thereby implement directed data plan services in the same way as infrastructure operators. Therefore, it is a difficult task for virtual operators to provide data plan services (e.g., directed data plan services) to their own subscribers.

III. CONTENTS OF THE INVENTION

To solve the problem that virtual operators cannot provide data plan services (e.g., directed data plan services) in the same way as infrastructure operators because they do not possess infrastructural network resources, the object of the present invention is to provide directed data plan service-launching system and method for a virtual operator, to help virtual operators to provide directed data plan services to their customers.

To attain the object described above, the directed data plan service-launching system for a virtual operator in the present invention comprises: an intelligent communication terminal, a directed data plan system of virtual operator, a billing system of virtual operator, and an application background server, wherein, the intelligent communication terminal performs statistics on mobile network traffic consumed by an application clients and stores traffic data, and uploads the traffic data to the directed data plan system of virtual operator;

the directed data plan system of virtual operator manages subscriber information and directed data plan information, consolidates the traffic data, and form directed data plan bills;

the billing system of virtual operator calculates billing discounts or performs billing at specific prices for the directed data plan bills;

the application background service system provides background services for the application clients.

Wherein, the system further comprises: a billing system of infrastructure operator, which acquires subscriber traffic data bills from core network elements of an infrastructure operator, accomplishes billing of own subscribers of the infrastructure operator, sorts and acquires subscriber traffic data bills of a contracted virtual operator and transmits the subscriber traffic data bills to the billing system of virtual operator. Wherein, the intelligent communication terminal comprises a vendor application directed data plan client configured to perform statistics on mobile network data traffic consumed by the application client.

Wherein, the intelligent communication terminal comprises a vendor application directed data plan management client configured to identify the application client and perform statistics on mobile network data traffic consumed by each application client. To attain the object described above, the directed data plan service-launching method for a virtual operator in the present invention comprises the following steps:

1) performing statistics on mobile network data traffic and storing traffic data, by an intelligent communication terminal;
2) uploading the traffic data to a directed data plan system of virtual operator periodically;
3) performing traffic data bill consolidation and forming directed data plan bills, by a directed data plan system of virtual operator;
4) calculating billing discounts or performing billing at specific prices for the directed data plan bills, by a billing system of virtual operator.

Wherein, the step 1) further comprises the following steps: receiving subscriber operations, and starting the directed data plan client of virtual operator to access an application background service system, by the intelligent communication terminal;

performing statistics on data traffic consumed by the directed data plan client of virtual operator and storing traffic data, by the directed data plan client of virtual operator.

Wherein, the step 1) further comprises the following steps:

receiving subscriber operations, and starting an application client to access the application background service system, by the intelligent communication terminal;

identifying the started application client, by a directed data plan management client of virtual operator;

performing statistics on mobile network data traffic consumed by each application client, by the vendor application directed data plan management client.

With the system and method provided in the present invention, a virtual operator can further save the time required for calculating traffic charge in a service plan and deduct the usable traffic in a traffic account in a limited manner when a subscriber uses the service normally, to attain a purpose of providing directed data plan service free of charge to the subscriber; the generation of unnecessary traffic can be avoided effectively; the traffic bills can be transmitted to a directed data plan billing system of virtual operator, the received traffic bills can be filtered according to subscriber traffic resource accounts created in the billing system of virtual operator, and compensation can be made to the subscriber traffic accounts, so as to implement directed data plans better and provide more professional services to the subscribers.

Other features and advantages of the present invention will be explained in the following text, and some will become more obvious from the Description, or will be understood through implementation of the present invention.

IV. BRIEF DESCRIPTION OF DRAWINGS

The accompanying drawings are provided to help further understanding of the present invention, and constitute a part of the description. These drawings are used in conjunction with the embodiments of the present invention to interpret the present invention, but do not constitute any limitation to the present invention. In the figures.

V. EMBODIMENTS

Hereunder some embodiments of the present invention will be described, with reference to the accompanying drawings. It should be appreciated that the preferred embodiments described here are only provided to describe and interpret the present invention, but do not constitute any limitation to the present invention.

Figure 1:
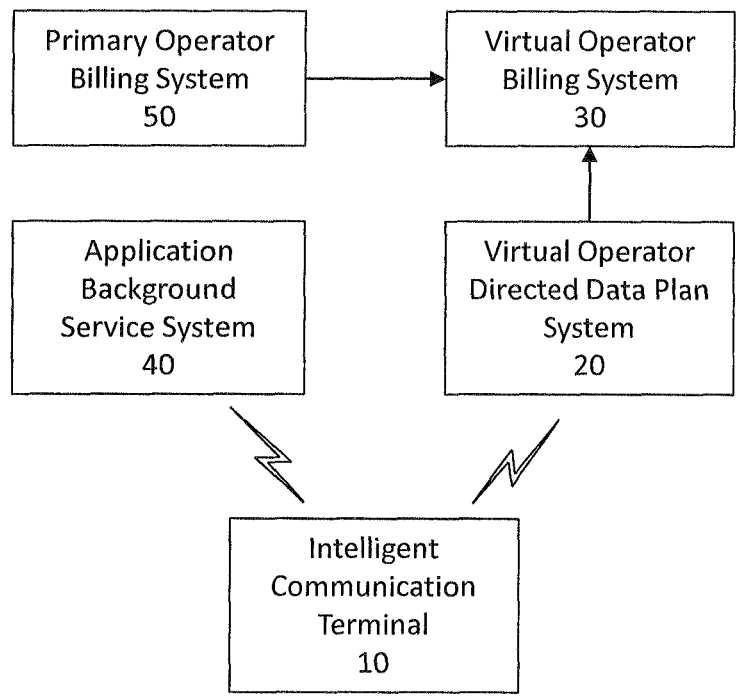
FIG. 1 is a block diagram of the directed data plan service-launching system for a virtual operator according to the present invention.

FIG. 1 is a block diagram of the directed data plan service-launching system for a virtual operator according to the present invention. As shown in FIG. 1, the directed data plan service-launching system for a virtual operator according to the present invention comprises an intelligent communication terminal 10, a directed data plan system of virtual operator 20, a billing system of virtual operator 30, a background application service system 40, and a billing system of infrastructure operator 50, wherein, the intelligent communication terminal 10 is connected to the directed data plan system of virtual operator 20 and the background application service system 40 respectively through a mobile network; identifies and performs statistics on mobile network data traffic consumed by an application client, and uploads traffic data to the directed data plan system of virtual operator 20; and receives services provided by the background application service system 40.

The directed data plan system of virtual operator 20 manages subscriber information and directed data plan information, receives traffic data uploaded from the intelligent communication terminal 10, consolidates the traffic data, forms directed data plan bills, and transmits the directed data plan bills to the billing system of virtual operator 30.

The billing system of virtual operator 30 is connected to the billing system of infrastructure operator 50 over Internet, receives subscriber traffic bills of the virtual operator transmitted from the billing system of infrastructure operator 50, accomplishes billing of the subscribers of the virtual operator; receives directed data plan bills transmitted from the directed data plan system of virtual operator 20, and calculates traffic billing discounts for directed data plans of the subscribers.

The application background service system 40 is a background service system for vendor application clients, and provides background services to the vendor application clients.

The billing system of infrastructure operator 50 acquires subscriber traffic data bills from core network elements of an infrastructure operator, accomplishes billing of own subscribers of the infrastructure operator, sorts and acquires subscriber traffic data bills of a contracted virtual operator, forms subscriber traffic data bills and transmits the subscriber traffic data bills to the billing system of virtual operator 30.

Embodiment 1

In this embodiment, the intelligent communication terminal 10 comprises a vendor application directed data plan client, which performs statistics on mobile network data traffic consumed by the application, so that the intelligent communication terminal 10 uploads traffic data to the directed data plan system of virtual operator 20.

The vendor application directed data plan client is applied based on a model of cooperation between a virtual operator and an application vendor, and is formed by embedding SDKs provided by the virtual operator in an existing application client of the vendor. The directed data plan application client with embedded SDKs can perform statistics on mobile network data traffic consumed by the application and upload the result of traffic bills to the directed data plan system of virtual operator via the intelligent communication terminal 10.

Figure 2:
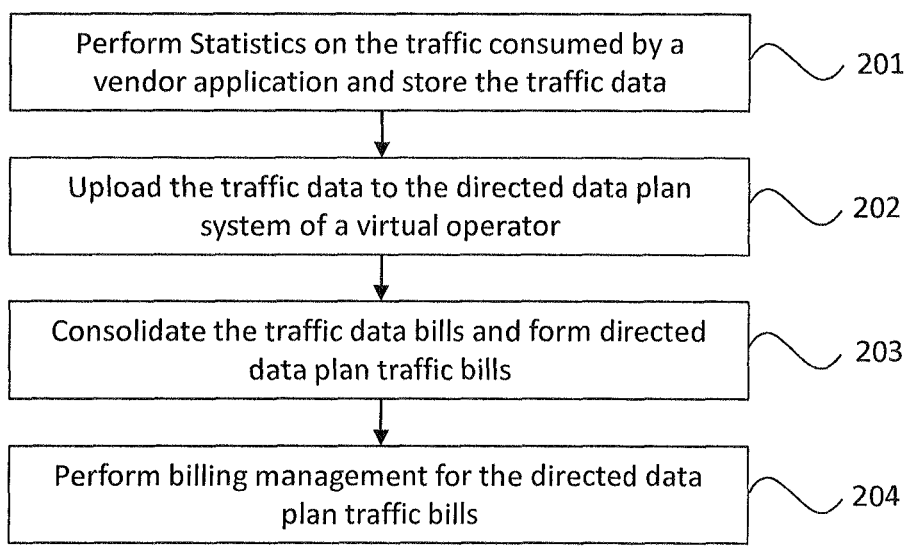
FIG. 2 is a workflow diagram of embodiment 1 of the directed data plan service-launching method for a virtual operator according to the present invention.

FIG. 2 is a workflow diagram of embodiment 1 of the directed data plan service-launching method for a virtual operator according to the present invention. Hereunder the directed data plan service-launching method for a virtual operator according to the present invention will be detailed with reference to FIG. 2.

First, in step 201, the vendor application directed data plan client in the intelligent communication terminal 10 is started, obtains services provided by the application background service system 40, and consumes mobile network data traffic; the vendor application directed data plan client performs statistics on mobile network data traffic consumed by itself, and stores the traffic data in a storage module in the intelligent communication terminal 10;

in step 202, the intelligent communication terminal 10 uploads the traffic data stored in the storage module to the directed data plan system of virtual operator 20 periodically;

in step 203, the directed data plan system of virtual operator 20 receives the traffic data transmitted from the intelligent communication terminal 10, consolidates the traffic bills, forms directed data plan bills, and transmits the directed data plan bills to the billing system of virtual operator 30;

in step 204, the billing system of virtual operator 30 calculates billing discounts or performs billing at specific prices for the directed data plan bills uploaded from the directed data plan system of virtual operator 20.

The billing system of virtual operator 40 performs synchronization for all access traffic bills of the subscribers of the virtual operator, sorts and acquires the traffic bills, and transmits the traffic bills to the billing system of virtual operator 30.

In this embodiment, a subscriber starts the vendor application directed data plan client in the intelligent communication terminal, the vendor application directed data plan client performs statistics on mobile network data traffic consumed by the application client accessing the application background service system, and stores the traffic data in a storage module of the intelligent communication terminal;

the intelligent communication terminal uploads the stored statistical data of traffic consumed by the application client to the directed data plan system of virtual operator through the mobile network and Internet periodically;

the directed data plan system of virtual operator consolidates the traffic data uploaded from the intelligent communication terminal, and transmits traffic bills within the range of a directed data plan to the billing system of virtual operator, on the basis of the directed data plan;

the billing system of virtual operator creates a subscriber traffic resource account, and makes compensation to the subscriber traffic account according to the received traffic bills of the directed data plan system of virtual operator;

the usable traffic in the traffic resource account is deducted in precedence when the subscriber uses the service normally, to attain a purpose of providing a directed data plan service free of charge to the subscriber.

With the system and method described above, the usable traffic in the traffic resource account is deducted in precedence when the subscriber uses the service normally; thus, a directed data plan service provided by the virtual operator to a subscriber is realized.

Embodiment 2

In this embodiment, the intelligent communication terminal 10 comprises a vendor application directed data plan management client, which can identify the application clients in the intelligent communication terminal 10, performs statistics on mobile network data traffic consumed by each application client, and uploads the result of traffic bills via the intelligent communication terminal 10 to the directed data plan system of virtual operator 20.

Figure 3:
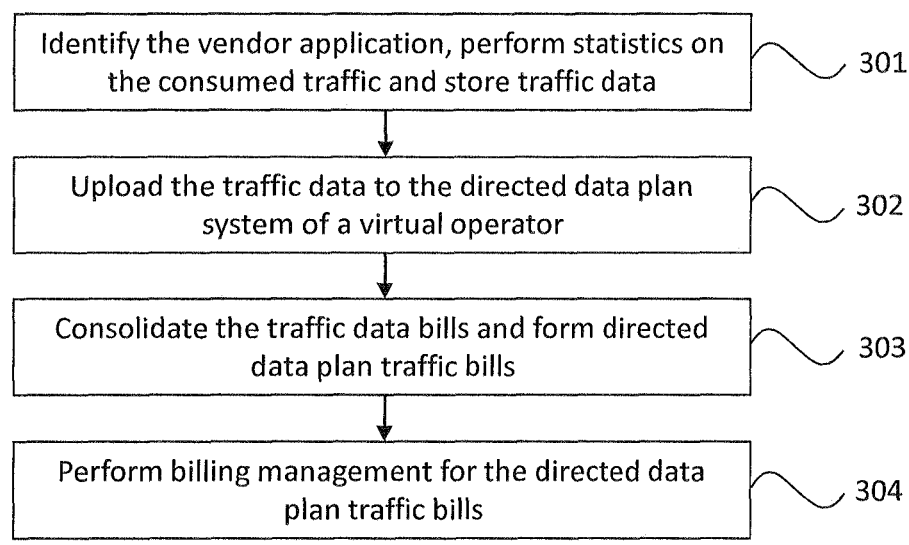
FIG. 3 is a workflow diagram of embodiment 2 of the directed data plan service-launching method for a virtual operator according to the present invention.

FIG. 3 is a workflow diagram of embodiment 2 of the directed data plan service-launching method for a virtual operator according to the present invention. Hereunder the directed data plan service-launching method for a virtual operator according to the present invention will be detailed with reference to FIG. 3.

First, in step 301, the vendor application directed data plan management client in the intelligent communication terminal 10 is started and monitors the start of all application clients in the intelligent communication terminal 10, identifies any application client that consumes mobile network data traffic, performs statistics on mobile network data traffic consumed by the application client, and stores the traffic data in a storage module in the intelligent communication terminal 10;

in step 302, the intelligent communication terminal 10 uploads the traffic data stored in the storage module to the directed data plan system of virtual operator 20 periodically;

in step 303, the directed data plan system of virtual operator 20 receives the traffic data transmitted from the intelligent communication terminal 10, consolidates the traffic bills, forms directed data plan bills, and transmits the directed data plan bills to the billing system of virtual operator 30;

in step 304, the billing system of virtual operator 30 calculates billing discounts or performs billing at specific prices for the directed data plan bills uploaded from the directed data plan system of virtual operator 20.

The billing system of virtual operator 40 performs synchronization for all access traffic bills of the subscribers of the virtual operator, sorts and acquires the traffic bills, and transmits the traffic bills to the billing system of virtual operator 30.

In this embodiment, the directed data plan management client of virtual operator is started automatically after the intelligent communication terminal 10 is powered on; after the subscriber starts an application client in the intelligent communication terminal 10, the directed data plan management client of virtual operator identifies the started application client, performs statistics on mobile network data traffic consumed by the application client accessing the application background service system 40, and stores the traffic data;

the directed data plan management client of virtual operator uploads the stored statistical data of traffic consumed by the vendor application client to the directed data plan system of virtual operator through the mobile network and Internet periodically; the directed data plan system of virtual operator consolidates the traffic data uploaded from the intelligent communication terminal, and transmits traffic bills within the range of a directed data plan to the billing system of virtual operator, on the basis of the directed data plan;

the billing system of virtual operator creates a subscriber traffic resource account, and makes compensation to the subscriber traffic account according to the received traffic bills of the directed data plan system of virtual operator;

the usable traffic in the traffic resource account is deducted in precedence when the subscriber uses the service normally, to attain a purpose of providing a directed data plan service free of charge to the subscriber.

Those skilled in the art should appreciate: the embodiments described above are only some preferred embodiments of the present invention, and should not be deemed as constituting any limitation to the present invention. Though the present invention is described and illustrated in detail with reference to the embodiments, the present invention is not limited to these embodiments. Those skilled in the art can easily make modifications to the technical scheme described above in the embodiments or make equivalent replacement of some technical features. Any modification, equivalent replacement, or refinement to the embodiments without departing from the spirit and the principle of the present invention shall be deemed as falling into the scope of protection of the present invention.

The invention claimed is:

1. A directed data plan service-launching system for a virtual operator, comprising: an intelligent communication terminal, a directed data plan server of the virtual operator, a billing server of the virtual operator, and an application background server, wherein, the intelligent communication terminal comprises a vendor application directed data plan client configured to perform statistics on mobile network traffic consumed by an application client and store traffic data, and uploads the traffic data to the directed data plan server of the virtual operator, wherein the vendor application directed data plan client is applied based on a model of cooperation between the virtual operator and an application vendor, and is formed by embedding software development kits (SDKs) provided by the virtual operator in an existing application client of the vendor;

the directed data plan server of the virtual operator manages subscriber information and directed data plan information, consolidates the traffic data, and forms directed data plan bills;

a billing server of an infrastructure operator calculates billing discounts or performs billing at specific prices for the directed data plan bills; and the application background server provides background services for the application client.

2. The directed data plan service-launching system for a virtual operator according to claim 1, wherein the billing server of an infrastructure operator acquires subscriber traffic data bills from core network elements of an infrastructure operator, accomplishes billing of own subscribers of the infrastructure operator, sorts and acquires subscriber traffic data bills of a contracted virtual operator and transmits the subscriber traffic data bills to the billing server of the virtual operator.

3. The directed data plan service-launching system for a virtual operator according to claim 1, wherein the intelligent communication terminal comprises a vendor application directed data plan management client configured to identify the application client and perform statistics on mobile network data traffic consumed by each application client.

4. A directed data plan service-launching method for a virtual operator, comprising the following steps:

1) performing statistics on mobile network data traffic and storing traffic data, by an intelligent communication terminal having a vendor application directed data plan client, wherein the vendor application directed data plan client is applied based on a model of cooperation between the virtual operator and an application vendor, and is formed by embedding software development kits (SDKs) provided by the virtual operator in an existing application client of a vendor;

2) uploading the traffic data to a directed data plan server of a virtual operator periodically;

3) performing traffic data bill consolidation and forming directed data plan bills, by a directed data plan server of the virtual operator; and 4) calculating billing discounts or performing billing at specific prices for the directed data plan bills, by a billing server of the virtual operator.

5. The directed data plan service-launching method for a virtual operator according to claim 4, wherein step 1) further comprises the following steps:

receiving subscriber operations, and starting the directed data plan client of virtual operator to access an application background server, by the intelligent communication terminal; and performing statistics on data traffic consumed by the directed data plan client of virtual operator and storing traffic data, by the directed data plan client of virtual operator.

6. The directed data plan service-launching method for a virtual operator according to claim 4, wherein step 1) further comprises the following steps:

receiving subscriber operations, and starting an application client to access the application background server, by the intelligent communication terminal;

identifying the started application client, by a directed data plan management client of virtual operator; and performing statistics on mobile network data traffic consumed by each application client, by the vendor application directed data plan management client.

* * * * *